United States Patent [19]

Offen

[11] Patent Number: 5,172,644
[45] Date of Patent: Dec. 22, 1992

[54] METHOD AND APPARATUS FOR ENHANCED SUPPRESSION OF THE MULTIPLE POLLUTANTS PRODUCED BY A COMBUSTED FUEL

[75] Inventor: George R. Offen, Woodside, Calif.

[73] Assignee: Electric Power Research Institute, Inc., Palo Alto, Calif.

[21] Appl. No.: 888,455

[22] Filed: May 20, 1992

Related U.S. Application Data

[63] Continuation of Ser. No. 806,730, Dec. 12, 1991, abandoned.

[51] Int. Cl.$^5$ .......................... F23J 11/00; F23J 15/00
[52] U.S. Cl. ..................................... 110/345; 110/264; 110/347; 422/169; 423/244.01
[58] Field of Search ............... 110/345, 344, 347, 263, 110/264; 422/168, 169; 55/98, 99; 423/240, 244

[56] References Cited

U.S. PATENT DOCUMENTS

| | | |
|---|---|---|
| 3,767,592 | 10/1973 | Kwok et al. . |
| 4,572,085 | 2/1986 | Hepworth ............................ 110/345 |
| 4,603,119 | 7/1986 | Karl et al. . |
| 4,645,654 | 2/1987 | Barezak ................................ 423/244 |
| 4,765,258 | 8/1988 | Zauderer . |
| 4,800,825 | 1/1989 | Kuenzly ............................ 110/345 |
| 4,807,542 | 2/1989 | Dykema . |
| 4,855,116 | 8/1989 | Richter et al. . |
| 4,873,930 | 10/1989 | Egense et al. . |
| 4,920,898 | 5/1990 | Solbes et al. . |
| 5,024,171 | 6/1991 | Krigmont et al. ................... 110/345 |

OTHER PUBLICATIONS

Shamekhi, Reza et al.; "Research Into Activated Carbon Technology on Harmful Organi Substances, Heavy Metala and Nox-Control", Air & Waste Management Association Presentation, Jun. 24, 1990.

Marnet, Chrysanth et al.; "Use of Lignite Coke for Reduction of $NO_x$ After Flue Gas Desul-Phurization".

Primary Examiner—Edward G. Favors
Attorney, Agent, or Firm—Flehr, Hohbach, Test, Albritton & Herbert

[57] ABSTRACT

A method and apparatus for suppressing multiple pollutants is disclosed. The apparatus includes a slagging combustor which effectively reduces the bulk of the $NO_x$ and $SO_2$ produced through the combustion of coal. The slagging combustor also converts the bulk of the noncombustible material in the coal into a vitrified waste product. Following utilization of their thermal energy, the combustion products from the slagging combustor are conveyed to a lignite coke system. The lignite coke system provides additional suppression of the $NO_x$, $SO_2$, and solid noncombustible byproducts. In addition, the lignite coke system suppresses the gaseous toxic pollutants that exit the slagging combustor with the combustion gases. The spent coke is recycled to the combustor where its fuel value is used to reduce raw fuel requirements and noncombustible materials captured by the coke exit the combustor as part of the vitrified slag. In sum, extremely efficient reduction of $NO_x$, $SO_2$ and solid noncombustible pollutants is realized, gaseous toxic pollutants are suppressed, and solid waste byproducts are in a vitrified form which will resist future leaching.

10 Claims, 1 Drawing Sheet

METHOD AND APPARATUS FOR ENHANCED SUPPRESSION OF THE MULTIPLE POLLUTANTS PRODUCED BY A COMBUSTED FUEL

This is a continuation of application Ser. No. 07/806,730 filed Dec. 12, 1991, abandoned.

BRIEF DESCRIPTION OF THE INVENTION

This invention relates generally to the reduction of pollutants produced by a combusted fuel. More particularly, this invention utilizes a slagging combustor system and a lignite-derived activated coke system to realize efficient and enhanced reduction of the multiple pollutants produced by the combustion of a carbonaceous fuel.

BACKGROUND OF THE INVENTION

The combustion of carbonaceous fuels by power plants produces a number of pollutants. First, gaseous pollutants such as $NO_x$ and $SO_2$ are released during the combustion of these fuels. Next, toxic pollutants are carried within the combustion gases resulting from the combustion of carbonaceous fuels. Toxic pollutants include gaseous mercury, complex organics, and halogens, as well as solid inorganic trace elements. Finally, the solid waste materials produced from the combustible materials (bottom ash and fly ash) may eventually result in additional pollution. This pollution source may be generated if the solid waste materials are disposed on or in the ground and contain contaminants in a leachable form such that they may eventually migrate into water supplies.

Presently, separate dedicated systems are utilized for the suppression of each individual pollutant. For instance, groundwater is protected from the ash leachate of solid waste materials by liners and leachate recovery systems.

The removal of $SO_2$ is typically achieved by a reaction with a calcium-based substance. The byproducts of this reaction are commonly precipitated and then disposed.

Moderate levels of $NO_x$ reduction (e.g., 50-60%) are typically achieved using a low $NO_x$ combustion system. If greater $NO_x$ reductions are required, a system is used that injects ammonia, urea, or related compounds downstream of the combustion zone. If done at 600° to 300° Fahrenheit, a catalyst is required and the process is called selective catalytic reduction.

Solid pollutants (fly ash) are controlled through a variety of techniques. The most common technique is to precipitate the fly ash with an electrostatic precipitator or arrest it with a baghouse.

Recently, slagging combustors have been developed which substantially reduce $NO_x$ and $SO_2$ emissions. Slagging combustors also have the benefit of converting 60-90% of the noncombustible material in the fuel (the ash) into a vitrified slag which is resistant to leaching. While slagging combustors capture most of the $NO_x$, $SO_2$, and particulate (ash) produced by combustion, additional $NO_x$, $SO_2$, and particulate controls are needed to achieve very low emissions.

Lignite coke (i.e., activated coke derived from lignite) systems have been employed to remove $SO_2$, $NO_x$, and gaseous toxic pollutants. They also capture fly ash. These systems have been used downstream of cyclone boilers and municipal waste garbage incinerators. Because coke consumption becomes unacceptably high if these systems are used as the sole $SO_2$ and fly ash control, they have been utilized in a staged process which includes a number of expensive devices. For example, for coal fired boilers, an electrostatic precipitator is typically used for fly ash precipitation. Then, a flue gas desulphurization (FGD) apparatus is used to remove $SO_2$. Because the lignite coke system will remove residual $SO_2$, the FGD may be a lower cost device capable of only moderate $SO_2$ removal. Such a system could comprise a suspension of hydrated lime sprayed into the flue gas stream within a reaction section. In this case, another electrostatic precipitator is used for the precipitation of the desulfurized products from the desulphurization apparatus.

OBJECTS AND SUMMARY OF THE INVENTION

It is a general object of the present invention to provide a method and apparatus for suppression of the multiple pollutants produced by a combusted fuel.

It is a more particular object of the present invention to provide a method and apparatus for suppression of gaseous pollutants, gaseous and solid toxic pollutants, and leachable waste material pollutants produced by a combusted fuel.

It is another object of the present invention to take advantage of the synergistic attributes of two distinct technologies by combining them to produce an efficient and enhanced method and apparatus for suppression of multiple pollutants produced by a combusted fuel.

It is a related object of the present invention to provide an efficient pollution suppression apparatus which does not rely upon elaborate pollution suppression devices such as scrubbers, spray dryers, or high efficiency particulate controls.

These and other objects are achieved by a method and apparatus for suppressing multiple pollutants. The apparatus includes a slagging combustor which effectively reduces the bulk of the $NO_x$ and $SO_2$ produced through the combustion of coal. The slagging combustor also converts the bulk of the noncombustible material in the coal into a vitrified waste product. The combustion products, which may be used for steam or hot water generation, are eventually conveyed to a lignite coke system. The lignite coke system provides additional suppression of the $NO_x$ and $SO_2$ byproducts. In addition, the lignite coke system suppresses the gaseous toxic pollutants that exit the slagging combustor with the combustion gases. Finally, the lignite coke system captures any remaining fly ash (including solid toxic compounds) in the combustion gases. In sum, extremely efficient reduction of $NO_x$ and $SO_2$ pollutants is realized, gaseous and solid toxic pollutants are suppressed, and solid waste byproducts are in a vitrified form which will resist future leaching.

BRIEF DESCRIPTION OF THE DRAWINGS

For a better understanding of the nature and objects of the invention, reference should be had to the following detailed description taken in conjunction with FIG. 1 which depicts an apparatus for suppressing multiple pollutants, in accordance with the present invention.

DETAILED DESCRIPTION OF THE INVENTION

Figure 1:
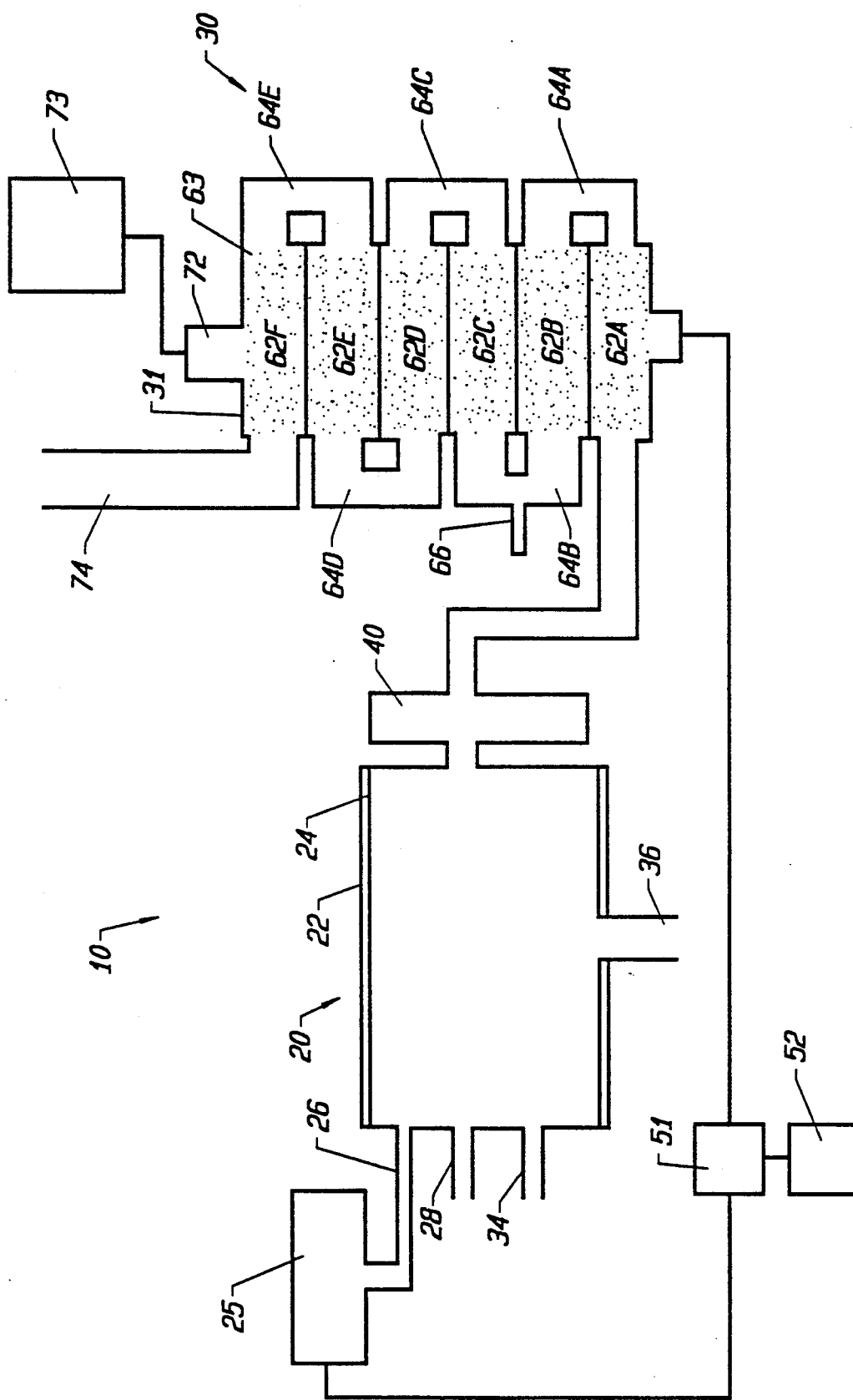

In accordance with the present invention, FIG. 1 depicts an apparatus for suppressing multiple pollutants 10. The primary components of the invention include a slagging combustor 20 and a lignite coke system 30. As will be appreciated by one skilled in the art, these components will typically be used in conjunction with a water-heating or steam-raising boiler which is in turn used to drive a turbine for the production of electricity.

Slagging combustor 20 substantially reduces $NO_x$. Slagging combustor 20 also eliminates the majority of the $SO_2$ produced through coal combustion. In addition, slagging combustor 20 converts most of the noncombustible ash in coal into a vitrified slag. The vitrified slag represents a lower environmental risk than ash from pulverized coal combustion because it is resistant to leaching. Consequently, elaborate and expensive leachate liners and leachate recovery systems are not required.

To further enhance the operation of the slagging combustor 20, it is coupled to lignite coke system 30. Lignite coke system 30 utilizes relatively inexpensive lignite coke to adsorb residual $SO_2$ and capture residual ash. Lignite coke system 30 also serves as a low-temperature catalyst for the selective catalytic reduction of residual $NO_x$ emissions. Further, lignite coke system 30 captures toxic gases such as mercury, chlorine compounds, and fluorine compounds. In addition, because the lignite coke is relatively inexpensive, the spent coke (full of adsorbed $SO_2$ and captured ash) can be used as fuel in the slagging combustor. Therefore, essentially all the ash leaves the system as vitrified slag. Thus, in a synergistic combination, the lignite coke system 30 enhances the operation of the slagging combustor 20 by further reducing $NO_x$, $SO_2$ and ash emissions, while the slagging combustor not only lessens the pollution reduction demand on the lignite coke system 30, thereby reducing coke consumption, but also serves as an environmentally benign and energy-efficient user of the spent coke.

This brief overview of the present invention will indicate to those skilled in the art the substantial benefits associated with the present invention. First, an efficient dual stage apparatus is provided for essential elimination of $SO_2$ and substantial reduction of $NO_x$ pollutants. In addition, the individual stages each provide a benefit: the lignite coke system eliminates gaseous and solid toxic air pollutants, while the slagging combustor produces a vitrified solid waste which will resist future leaching from both the noncombustible ash in the coal and the used coke.

Having provided a brief overview of the present invention, attention turns to the details of the method and apparatus associated with the invention. Slagging combustor 20 includes a housing 22. The interior of the housing may include either a ceramic lining or water cooled tubes 24. At one end of the slagging combustor 20 one or more inlet devices are provided.

A coal fines injector 26 is provided for feeding pulverized coal to the combustor 20. Preferably, the pulverized coal includes particles between 20 and 200 microns in diameter. The coal fines are injected into the combustor 20 with a stream of primary combustion air. Secondary combustion air is provided by a secondary combustion air injector 28.

In one embodiment of a slagging combustor, a precombustor is used to heat the secondary air stream to help ignite the injected coal fines. This hot gas enters the main combustor 20 through the secondary air injector 28. The secondary air stream is utilized to create either a toroidal or a helical air flow within the combustor. If a toroidal flow is used, the ash remains in suspension, whereas with helical secondary air flow, the ash may impinge on the combustor walls and form a flowing slag.

The emission of $SO_2$ is minimized by utilizing the sorbent injector 34 to inject pulverized sorbent comprising a calcium oxide compound. As is known in the art, sulphur capture in the slagging combustor 20 occurs primarily as a result of rapid thermal calcination of the particles of limestone or other calcium oxide compounds suspended in the gas flow. This produces a very porous particle having a high sulphur capture rate. Entrained ash emissions are minimized by inertial impaction on cooled tubes placed across the gas flow path near the combustor exit. Ash can also be captured in the wall slag layer if the secondary air is injected with a high tangential velocity. In either case, ash emissions are minimized. The slag is then removed by slag outlet 36. As is known in the art, the emission of $NO_x$ is minimized in the slagging combustor 20 by providing combustion in a reducing stoichiometry, followed by a quick temperature reduction zone before adding the final air needed to complete the combustion.

The combustion products from the slagging combustor 20 are subsequently conveyed to some type of heat utilization element 40. The heat utilization element 40 converts the heat into mechanical energy which may be used for the generation of electricity or to provide hot water or steam to a production process. Naturally, the heat utilization element in FIG. 1 is not drawn to scale. After the combustion products are exploited by heat utilization element 40, they are conveyed to lignite coke system 30.

Preferably, lignite coke system 30 includes a chamber or reactor 31 which comprises a number of layered filter beds 62 filled with lignite coal 63. Preferably, each bed 62 is approximately 0.75 meters thick. The flue gas first passes through the bottom filter bed 62A. The flue gas then enters a reversing chamber 64A and passes through the next bed 62B.

Stages 62A and 62B represent residual cleaning stages. Any residual $SO_2$ entering the chamber 31 is removed from the flue gas in the two lower filter beds 62A and 62B. Typically, the first bed 62A also removes toxic gases and residual dust from the slagging combustor. After the removal of the $SO_2$, toxic gases and dust in filter beds 62A and 62B, ammonia injector 66 is preferably used to inject ammonia in the next reversing chamber 64B so that the nitrous oxides are catalytically reduced in the four upper filter beds 62C, 62D, 62E and 62F. Thus, stages 62C–62F represent refinement cleaning stages.

Preferably, this $NO_x$ reduction transpires at between 80° and 100° C. Thus, reheating of the combustion products is not required. The treated combustion products are ultimately released through stack 74.

The residual $SO_2$ contents and dust from the slagging combustor as well as several toxic gases (especially mercury, compounds of chlorine and fluorine gases, and any organic gases) are completely captured by the coke system 30.

Preferably, the lignite coke is removed once it becomes saturated; that is, when it is unable to adsorb $SO_2$ or gaseous toxics. The lignite coke is discharged at the lower end of the reactor by coke discharge 70. The discharged coke is moved by conventional means (conveyors or pneumatic lines) to the coal fines injector 26 and injected back into the slagging combustor 20. If the coke has become agglomerated, it may be necessary to pulverize it in the pulverizer 25 before injecting it into the slagging combustor 20. Further, unless the mercury level of the coal is insignificant, the mercury that has been adsorbed on the coke will need to be thermally desorbed and recovered in a manageable form by subsequent condensation in desorber 51 and condensor 52.

After a lignite coke discharge, additional lignite coke is provided at coke intake 72. Coke intake 72 is coupled to coke storage bin 73.

Preferably, the coke saturation level is monitored after the second bed 62B. If $SO_2$ appears in the combustion gases flowing through reversing chamber 64B, the coke is saturated, and preferably the lower filter bed 62A is then discharged. As a result, partially used coke settles into the lower filter bed 62A and new coke settles into the upper filter bed 62F.

Lignite coke adsorbs $SO_2$ from the flue gas and catalytically oxides it to sulphuric oxide which is retained in the coke through adsorption and chemical combination, as known by those skilled in the art. After the addition of $NH_3$, the catalytic breakdown of $NO_x$ then follows in the upper filter beds. The nitrous oxides are broken down into $N_2$ and $H_2O$ in the upper filter beds.

In order to achieve high $NO_x$ reduction with lignite coke, it is necessary to have sufficient residence time. Preferably, the flue gas should remain in the filter beds following $NH_3$ injection (i.e., 62C-F for the configuration of FIG. 1) for approximately 20 seconds.

As discussed, the discharged coke from coke discharge 70 may be reconveyed to the slagging combustor 20, using the spent coke for fuel instead of regenerating it. This can be done economically because lignite coke is relatively inexpensive, it is a fuel itself (i.e., replaces some coal fuel), and the feed rate will be relatively low because the capture of $SO_2$ in the slagging combustor (typically over 70%) reduces the amount of $SO_2$ reaching the lignite coke system and hence, the rate at which the coke fills up with $SO_2$. Further, by recycling the spent coke to the slagging combustor, the solids captured by the coke system join the slag leaving the combustor and, hence, become a vitrified material. This set of synergistic effects is available solely and uniquely by combining a slagging combustor with an activated coke system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An apparatus for suppressing the multiple pollutants produced by the combustion of a carbonaceous fuel, said apparatus comprising:

a slagging combustor for burning a carbonaceous fuel to produce high temperature combustion products, said slagging combustor providing substantial initial reduction of gaseous $SO_x$ and $NO_x$ pollutants within said combustion products, said slagging combustor further providing substantial conversion of the noncombustible fly ash in the coal into a vitrified solid waste; and a lignite coke system coupled to said slagging combustor and receiving said combustion products from said slagging combustor, following passage through a heat utilization device, said lignite coke system providing supplemental reduction of said gaseous $SO_x$, $NO_x$, and fly ash pollutants within said combustion products and capturing gaseous toxic pollutants within said combustion products, whereby said apparatus provides efficient and enhanced reduction of said $NO_x$, $SO_2$, and fly ash pollutants within said combustion products, suppresses said toxic pollutants within said combustion products, and produces only said vitrified solid waste byproducts which will resist future leaching.

2. The apparatus of claim 1 further comprising means for delivering saturated lignite coke from said lignite coke system to said slagging combustor.

3. The apparatus of claim 2 further comprising means for replacing said saturated lignite coke with non-saturated lignite coke.

4. The apparatus of claim 3 wherein said lignite coke system includes a plurality of vertically layered filter beds, each of said filter beds being coupled to an adjacent filter bed by a reversing chamber.

5. The apparatus of claim 4 wherein said reversing chamber includes an ammonia injector.

6. A method of suppressing the multiple pollutants produced by the combustion of a carbonaceous fuel, said method comprising the steps of:

utilizing a slagging combustor for burning a carbonaceous fuel to produce high temperature combustion products, said utilizing step resulting in substantial initial reduction of gaseous $SO_x$ and $NO_x$ pollutants within said combustion products, said utilizing step further providing substantial conversion of the noncombustible fly ash in the coal into a vitrified solid waste; and providing a lignite coke system for receiving said combustion products from said slagging combustor, following passage through a heat utilization device, said providing step resulting in supplemental reduction of said gaseous $SO_x$, $NO_x$ and fly ash pollutants within said combustion products and capturing said toxic pollutants within said combustion products, whereby said method provides efficient and enhanced reduction of said $NO_x$ and $SO_2$ pollutants within said combustion products, suppresses said gaseous toxic pollutants within said combustion products, and produces only said vitrified solid waste byproducts which will resist future leaching.

7. The method of claim 6 further comprising the step of delivering saturated lignite coke from said lignite coke system to said slagging combustor.

8. The method of claim 7 further comprising the step of replacing said saturated lignite coke with non-saturated lignite coke.

9. The method of claim 8 wherein said providing step includes forcing said combustion products through a plurality of filter beds which are coupled to one another by a plurality of reversing chambers.

10. The method of claim 9 wherein said providing step includes injecting ammonia into one of said plurality of reversing chambers.

* * * * *